Patented Aug. 15, 1939

2,169,957

UNITED STATES PATENT OFFICE 2,169,957

MODE OF TREATING TEA AND COFFEE AND PRODUCT THEREOF

Clarence G. Lehr, Baltimore, Md.

No Drawing. Application May 23, 1938, Serial No. 209,622

3 Claims. (Cl. 99—77)

The present invention relates to treating tea and coffee, that is to say the materials for making tea and coffee beverages, namely the dried tea leaves and roasted coffee berries, for the purpose of rendering insoluble the tannic acid content of the same, so that when the tea and coffee are subsequently used for making beverages, none or practically none of the tannic acid goes into solution in the tea or coffee beverages. It is well known that tannic acid is injurious to the human digestive system, and according to some authorities, tannic acid is responsible for a very large part of the ill effects of drinking tea and coffee.

In accordance with the present invention, I do not remove the tannic acid from the tea or coffee, but render the same insoluble therein. This can suitably be effected by producing a very intimate mixture of the tea or coffee with precipitated ferric hydroxide, and preferably this is done while the ferric hydroxide is in a freshly precipitated condition. Ferric hydroxide which has been ignited, or heated to a relatively high temperature, is not satisfactory for the purpose, since after the ferric hydroxide has been heated sufficiently to convert this into ferric oxide, the oxide is substantially inert as regards combining with tannic acid.

In a preferred form of my invention, the tea or the roasted coffee is ground to a finely pulverulent state, while in a dry condition. The said material is then mixed with ferric hydroxide precipitate, which is still in a moist state. For example a solution of a ferric salt, such as ferric chloride, can be made slightly alkaline with ammonia, and the precipitate allowed to settle, then the mother liquid is decanted and the sludge of ferric hydroxide is collected on a filter, and washed repeatedly with clean water such as distilled water, until it no longer has any taste of ammonium chloride, or until the water passing through the filter no longer gives a precipitate or cloudiness with an acid solution of silver nitrate. The ferric hydroxide precipitate can be pressed or centrifuged until nearly dry, i. e., until it contains from 50 to 70% of ferric hydroxide. It is inadvisable to remove more water than this. The ferric hydroxide sludge can be added to the tea or coffee, in amount much more than sufficient to combine with all tannic acid present in the tea or coffee, for example 100 parts of the powdered tea or coffee can be mixed with an amount of the precipitate containing 30 to 40 parts of actual ferric hydroxide, and the mixture can be further ground in a suitable mill, for example in a mortar and pestle.

The water still present in the tea or coffee is then evaporated at a low temperature, so as not to evaporate any substantial amount of the flavoring oils, which are volatile, contained in the tea or coffee. I have, in an experimental way, accomplished the drying by spreading out the powdered mixture on a table in direct sunshine, but for commercial practice, a blast of warm air, while agitating and tumbling the mixture could be employed.

The mixture of the powdered tea or coffee with the ferric hydroxide will then be put up into small bag, for example bags of rather close mesh cloth, each bag containing a sufficient amount of the tea or coffee to make one cup (or a desired number of cups) of the beverage. The bags should preferably be of a close mesh fabric because of the finely divided condition of the tea or coffee. One of these small bags can then be placed into a cup of boiling water, or water near the boiling point, and agitated therein in the usual manner for a few minutes when it can be taken out and discarded. Similarly a bag containing enough of the tea or coffee for a desired number of cups of beverage can be placed in the percolator or in a coffee pot of boiling hot water, and similarly agitated for a few minutes and then the bag pulled out and discarded, when the beverage is ready to pour into the cups.

It will be found that the beverage is free from tannins, or substantially free from tannins, the tannins having been converted into insoluble ferric compounds during the treatment.

Different kinds of tea and different kinds of coffee vary a good deal in the tannin content, and for commercial use of the process, it would be advisable to find by trial the smallest amount of ferric hydroxide which can be used with each ton of the tea or coffee at hand, to render the tannins therein insoluble. It will be understood that the proportions given above are purely for the purpose of illustration, and these amounts will be sufficient for any ordinary tea or coffee, but for many varieties of tea or coffee a much smaller amount of the ferric hydroxide would be sufficient.

I call attention to the fact that in the above description I have referred to the use of ferric hydroxide, and not ferric salts, ferric salts would be objectionable as imparting a highly unpleasant taste to the beverage.

The treated tea or coffee (preferably in the bags) is stable in storage for a considerable period, preferably sealed in air-tight tin cans.

I claim—

1. A mode of treatment of tea, coffee and similar materials to be used in making beverages, which comprises reducing said material to a finely divided condition and well incorporating therewith, freshly precipitated ferric hydroxide containing some water, and thereafter drying said mixture at a low temperature.

2. A process which comprises reducing tea or roasted coffee to a pulverulent state, adding a moist precipitate of ferric hydroxide in such proportions as to give 100 parts of the tea or coffee material to not over 30 parts of actual ferric hydroxide, grinding the mixture together to produce a very intimate mixture, and thereafter drying the material in a warm but not hot atmosphere.

3. Finely divided material of the type of tea, coffee and the like for making tannin-free beverages, containing a substantial amount of freshly precipitated ferric hydroxide, all in a dry stable condition.

CLARENCE G. LEHR.